United States Patent [19]

McKinney

[11] Patent Number: 5,221,470
[45] Date of Patent: Jun. 22, 1993

[54] APPARATUS FOR TREATING WASTE WATER

[76] Inventor: Jerry L. McKinney, P.O. Box 546, Silsbee, Tex. 77656

[21] Appl. No.: 808,424

[22] Filed: Dec. 16, 1991

[51] Int. Cl.⁵ .............................. C02F 3/06; C02F 3/20
[52] U.S. Cl. .................................. 210/151; 210/195.4; 210/220; 210/256; 210/311; 210/615; 261/122.1
[58] Field of Search .................. 210/150, 151, 195.3, 210/195.4, 220, 221.1, 221.2, 256, 258, 259, 305, 308, 311, 493.4, 497.1, 615; 261/122

[56] References Cited

U.S. PATENT DOCUMENTS

| | | | |
|---|---|---|---|
| 2,987,186 | 6/1961 | Burgoon et al. | 210/220 |
| 3,126,333 | 3/1964 | Williams | 210/151 |
| 3,347,381 | 10/1967 | Minch et al. | 210/150 |
| 3,837,494 | 9/1974 | Stevenson | 210/305 |
| 3,923,656 | 12/1975 | Krebs et al. | 210/86 |
| 3,923,657 | 12/1975 | Roser | 261/122 |
| 3,951,817 | 4/1976 | Snyder | 210/220 |
| 4,238,338 | 12/1980 | Kinzer | 210/195.4 |
| 4,246,114 | 1/1981 | Krebs et al. | 210/151 |
| 4,391,002 | 7/1983 | Marti | 210/221.2 |
| 4,608,157 | 8/1986 | Graves | 210/86 |
| 4,650,577 | 3/1987 | Hansel | 210/195.3 |
| 4,929,349 | 5/1990 | Beckman | 210/311 |
| 4,983,285 | 1/1991 | Nolen | 210/220 |

FOREIGN PATENT DOCUMENTS 1560486  4/1990  U.S.S.R. .

OTHER PUBLICATIONS

"Clearstream Model 500N" drawing.
Process Description-Singulair Model 900.
Zabel Multi-Purpose Filter brochures.

Primary Examiner—Wilbur Bascomb, Jr.
Assistant Examiner—Christopher Upton
Attorney, Agent, or Firm—Vaden, Eickenroht, Thompson, Boulware & Feather

[57] ABSTRACT

A waste water treatment plant is disclosed that uses aerobic bacteria to digest solid particles in the waste water. The plant includes a filter located just upstream of the outlet through which the water leaves the plant. The filter comprises an elongated sheet of plastic material that is wound upon itself with adjacent layers narrowly spaced to form an elongated narrow passageway. Aerobic bacteria grows on the walls of the passageway and across the top of the filter to digest the last solid particles from the water as the water slowly rises through the filter.

9 Claims, 2 Drawing Sheets

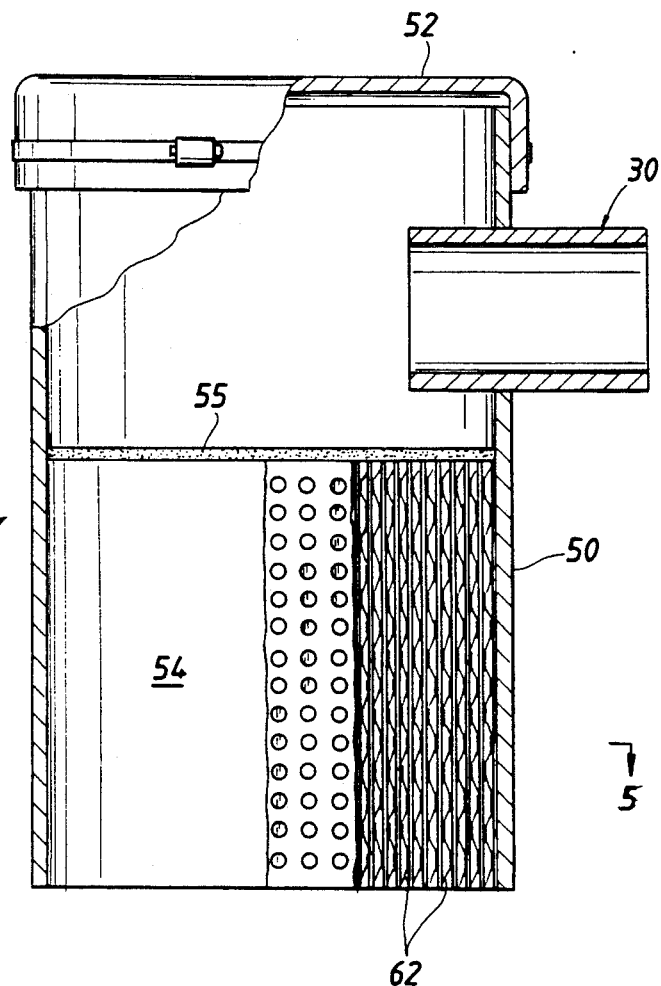
FIG.4
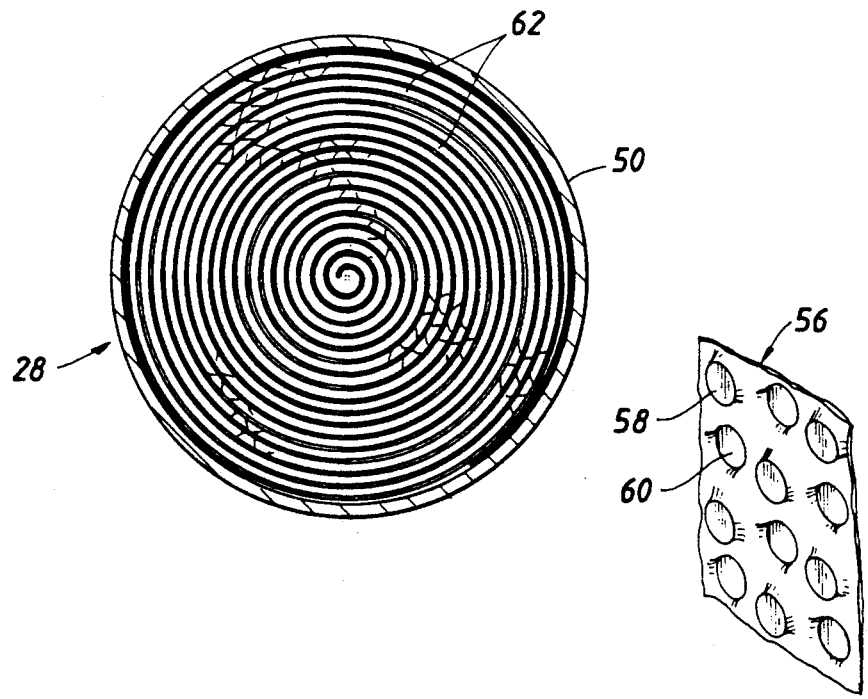
FIG.5
FIG.6

APPARATUS FOR TREATING WASTE WATER

This invention relates to waste water treatment plants that employ aerobic digestion and, in particular, to an improved filter for use in such waste water treatment plants.

This invention has utility with any aerobic waste water treatment plant but is particularly useful with relatively small treatment plants designed to handle the volume of waste water produced by one residence. Each plant includes an aeration chamber and a clarification chamber. The waste water enters the aeration chamber where air is bubbled through the liquid in the chamber to promote the bacteria aerobic that converts the solids in the waste water to carbon dioxide and water. The waste water flows from the aeration chamber into the clarification chamber where it rises slowly to an exit or discharge pipe through which it leaves the plant. Any solids remaining in the waste water when it enters the clarifier is expected to be converted by the bacteria in the clarifier before the water reaches the outlet. This doesn't always happen.

Therefore it is an object and feature of this invention to provide a filter upstream of the outlet of the clarifier chamber of the waste water treatment plant that is designed to remove any remaining solids in the water prior to the water leaving the plant through the outlet line.

It is another object and feature of this invention to provide a filter that doesn't remove solids by physically entrapping solids in the filter material but causes the solids to be intimately exposed to the bacteria that will convert the solids to water and carbon dioxide before the water leaves the plant. In this way, no back flushing or cleaning of the filter is required throughout its life.

It is a further object and feature of this invention to provide a filter in a waste water treatment plant that consists of a body of inert material that forms a plurality of narrow vertical passageways through which the waste water must rise as it moves upwardly to reach the outlet to cause the water to be intimately exposed to the bacteria growing on the walls of the passageways.

It is a further object and feature of this invention to provide a filter for a waste water treatment plant that comprises a cylindrical housing for positioning in the clarifier of the plant upstream from the outlet from the clarifier with its longitudinal axis vertical and its lower end open so water will move vertically through the housing and an elongated sheet of material wound into a spiral and forming a continuous narrow passageway through which the waste water must flow to reach the outlet.

In waste water treatment plants of this type, air is pumped into the aeration chamber through conduits that extend downwardly to a point adjacent the bottom of the chamber so that the air, as it rises, will pass through most of the liquid in the chamber. Air is usually supplied through plastic pipe, such as PVC pipe, having fine bubble diffusers attached at the lower end. The upper end of each pipe is connected to a source of air under pressure.

As shown in FIG. 1, the typical plant includes an outside tank that encloses the aeration and clarification chambers. These tanks are buried completely in the ground except for the very top portion which has an opening to provide access to the inside of the tank. Usually, the opening is much smaller in diameter than the diameter of the largest portion of the tank. As a result, the PVC air conduits that are located generally adjacent the outside walls of the tank are very difficult to get out of and to put back in the tank because of the limited space in the opening at the top of the tank.

Therefore, it is a further feature and object of this invention to provide air hose assemblies that include rigid conduits through which flexible air hoses extend to discharge air adjacent the bottom of the tank. These flexible hoses and the diffusers connected to them can be quickly and easily removed and replaced or repaired.

These and other objects, advantages, and features of this invention will be apparent to those skilled in the art from a consideration of this specification including the attached drawings and appended claims.

IN THE DRAWINGS

FIG. 4 is a view partly in elevation and partly in vertical section through the filter of this invention.

FIG. 5 is a sectional view taken along line 5—5 of FIG. 4.

FIG. 6 is an isometric view of a portion of the material used to form the filter element in the preferred embodiment of this invention.

Figure 1:
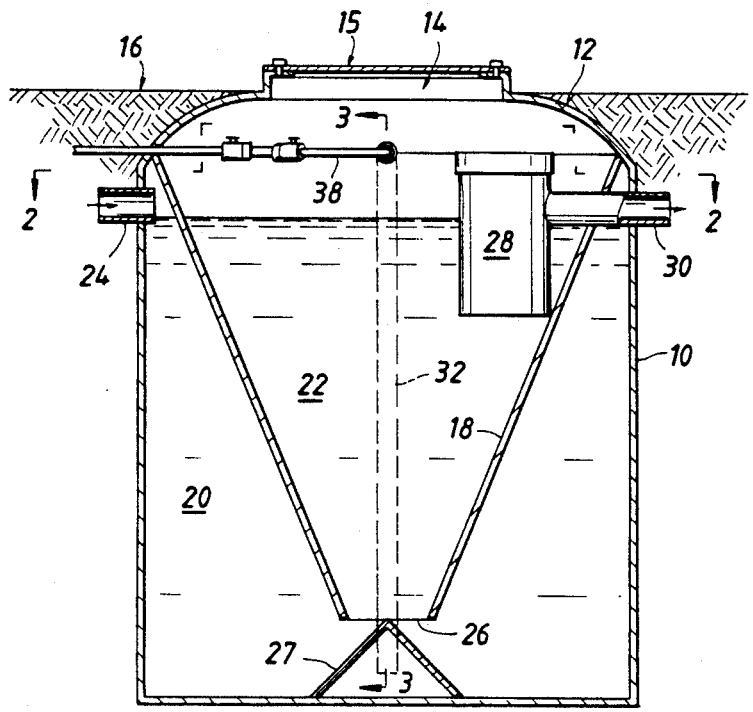
FIG. 1 is a vertical sectional view through the preferred embodiment of the treatment plant of this invention.
Figure 2:
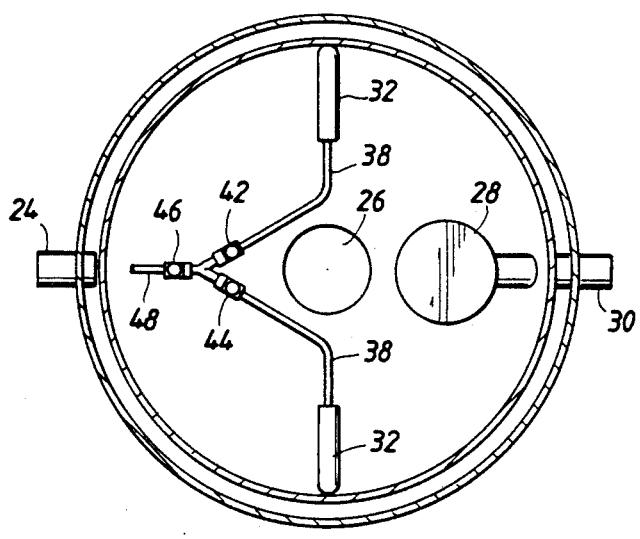
FIG. 2 is a sectional view taken along line 2—2 of FIG. 1.

The water treatment plant shown in the drawings includes cylindrical tank 10 with dome-shaped upper end 12. Opening 14 is located in the upper end to provide access to the inside of the tank. Usually, the tank is buried in the ground so that only opening 14 and its cover 15 are above ground.

Inside the tank is partition 18 that is shaped like an inverted, truncated, cone. Its upper end is attached to the dome portion of the housing. This partition divides the tank into two chambers, chambers 20 and 22. Chamber 20 is the aeration chamber and chamber 22 is the clarification chamber.

In operation, waste water from the residence or facility to which the plant is connected enters the aeration chamber through inlet 24. Flow through the plant is a result of hydrostatic pressure. The water entering inlet 24 will increase the hydrostatic head in aeration chamber 20 causing water to flow into opening 26 in the bottom of the clarifier above deflector 27. This causes the water in the clarifier to move upwardly through filter 28 and exit through outlet pipe 30.

Figure 3:
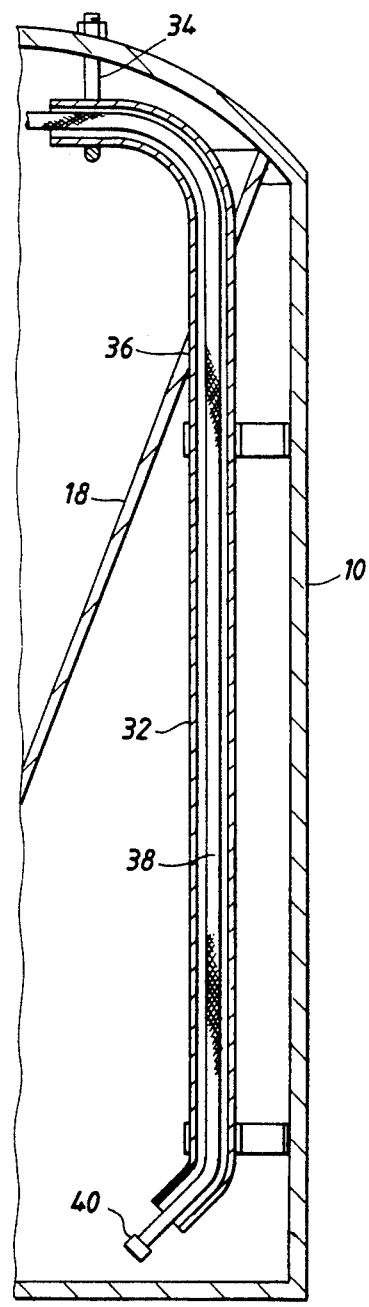
FIG. 3 is a sectional view taken along line 3—3 of FIG. 1.

Air is supplied to aeration chamber 20 by rigid conduits 32 that are mounted in the tank to extend downwardly into the aeration chamber to a position close to the bottom of the chamber. These conduits are supported by U-bolts 34. They are held in the position shown by the U-bolts and openings 36 in partition 18 through which they extend downwardly into the aeration chamber as shown in FIG. 3. Positioned in conduits 32 are flexible hoses 38 through which air is supplied to diffusers 40 connected to the end of the flexible hoses. The lower end of each rigid conduit is bent 45 out of alignment to keep the rising air away from the opening in the conduit.

In the embodiment shown, two air lines are shown. Air is supplied to the hoses through valves 42 and 44. Main control valve 48 is located in supply line 48. Alternatively, a three-way valve could be positioned at the intersection of the three lines.

When a diffuser plugs up or for whatever reason an air hose needs to be removed for repair or replacement, the hose is discovered from the valve manifold and simply pulled out of the rigid conduit in which it is located and out of the tank through opening 14. The new or repaired hose and diffuser can then be threaded back through the rigid conduit and reconnected to the valve manifold.

Filter 28 includes open ended cylindrical housing 50. The top end is closed by cap 52. Outlet 53 extends through the wall of housing 50 adjacent its upper end and filter element 54 is positioned in the housing below inlet 30, as shown in FIG. 4. By the time the water reaches the filter, it should be fairly free of solid particles and those that do remain should be relatively small. The idea of filter 54 is to cause this water to pass through a plurality of rather narrow openings or passageways upon the walls of which grows the aerobic bacteria that will remove the last of the particles in the water before it reaches outlet 30. The filter does not entrap the particles. The particles are simply converted by the bacteria to water and carbon dioxide as the water slowly moves upwardly through the narrow passageways of the filter. The layers of bacteria on the passageways are not shown.

In addition, by forming the filter with narrow vertical passageways, the filter will support a layer of aerobic bacteria across the top of the filter. This layer provides the final cleaning of solids from the water as the water flows upwardly toward outlet 30. This layer is indicated by the number 55.

In the embodiment shown, the filter consists of a sheet of plastic material, indicated by the number 56 in FIG. 6, that has protrusions 58 formed on one side of the sheet and protrusions 60 on the other side. The sheet of material is coiled into a spiral configuration, as shown in FIG. 5, with the protrusions acting to space the adjacent wraps of material to create one elongated narrow passageway through which the waste water must flow to reach outlet 30. The same effect could be obtained by a plurality of concentric rings of the material. It is easier, of course, to use the spiral configuration which, in effect, produces a plurality of narrow passageways 62 when viewed in section, as shown in FIG. 4.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. In a waste water treatment plant having an aeration chamber, an inlet located adjacent the top of the aeration chamber through which the waste water flows into the aeration chamber and downwardly toward the bottom of the aeration chamber, means for injecting air into the waste water in the aeration chamber to support the growth of aerobic microorganisms and a clarifier chamber within said aeration chamber, said clarifier chamber being formed by a partition in the form of an inverted, truncated cone-like member into the bottom of which the waster water flows from the aeration chamber and rises therein, the improvement comprising a filter housing mounted in the clarifier with an open lower end extending below the level of the waste water in the clarifier, a horizontal outlet tube connected to the filter housing through which the waste water can flow out of the filter housing and the clarifier, and a filter located in the housing below the level of waste water through which the waste water flows without turbulence to reach the outlet, said filter having a plurality of relatively narrow vertical passageways providing a large surface area for aerobic bacteria to cover and remove the small solid particles form the waste water as it flows upwardly through the filter toward the outlet, said means for injecting air in the aeration chamber also providing means to supply the aerobic bacteria covering the filter with sufficient oxygen to keep it functioning.

2. The waste water treatment plant of claim 1 in which the plurality of passageways through the filter are arranged and constructed to support a layer of aerobic bacteria across the top of the filter through which the waste water must pass to reach the outlet.

3. The waste water treatment plant of claim 1 in which the passageways in the filter are labyrinthine and are formed by a spirally wound sheet of plastic material having protrusions extending from both sides of the sheet to hold adjacent folds spaced apart.

4. A waste water treatment plant comprising an aeration chamber and a clarification chamber within said aeration chamber, said clarifier chamber being formed by a partition in the form of an inverted, truncate cone-like member, an inlet at the upper end of the aeration chamber through which waste water can enter the chamber, means for aerating the liquid in the aeration chamber to promote aerobic digestion of the organic solids in the waste water in the aeration chamber and the clarification chamber, a passageway between the aeration chamber and the lower end of the clarification chamber to cause the waste water to flow upwardly in the clarification chamber without turbulence to allow large solid particles to fall downwardly through the upwardly moving waste water and reenter the aeration chamber, a filter housing mounted in the upper end of the clarification chamber, an outlet conduit connected at one end to the upper end of the filter housing with the other end extending laterally out of the clarification chamber through which the waste water can flow out of the clarification chamber as it rises in the clarification chamber and the filter housing, a filter in the filter housing through which all of the waste water flows to reach the outlet conduit, said filter having a plurality of elongated, narrow, vertical passageways to provide a large surface area for aerobic bacteria to cover so the bacteria will remove the small solid particles from the waste water as it flows upwardly through the passageways at a flow rate that will allow any large particles reaching the filter to fall downwardly to the bottom of the clarifier.

5. The waste water treatment plant of claim 4 further provided with a plurality of relatively rigid conduits extending downwardly into the aeration chamber, a flexible air hose extending through each conduit to supply air to the lower section of the aeration chamber, and a diffuser attached to the end of each air hose to supply the air to the chamber in bubbles, said diffuser being small enough to pass through the rigid conduit to allow the flexible hose and diffuser to be removed from the rigid conduit for repair or replacement.

6. The waste water treatment plant of claim 4 in which the passageways are arranged and constructed to support a layer of aerobic bacteria across the top of the filter through which the waste water must pass to reach the outlet.

7. The waste water treatment plant of claim 4 in which the passageways in the filter are labyrinthine and are formed by a spirally wound sheet of plastic material having protrusions extending from both sides of the sheet to hold adjacent folds spaced apart.

8. A waste water treatment plant comprising an aeration chamber with generally vertical side walls, means for introducing air into the aeration chamber to support the growth of aerobic micro organisms which decompose certain organic substances, a clarifier positioned in the aeration chamber being formed by a partition in the form of an inverted, truncated cone-like member having an opening in the bottom through which the waste water can enter from the aeration chamber and rise slowly in the clarifier, a filter housing mounted in the clarifier and extending below the level of the waste water in the clarifier, an outlet tube connected to the filter housing through which the treated waste water can flow out of the filter housing and the clarifier, a filter located in the filter housing below the level of waste water in the housing through which the waste water flows to reach the outlet, said filter having a plurality of relatively narrow vertical passageways providing a large surface area for aerobic bacteria to cover and remove the small solid particles form the waste water as it flows upwardly through the filter toward the outlet with no turbulence.

9. A waste water treatment plant comprising a tank having a top access cover for burying in the ground with only its top access cover above ground, an inverted conical vessel mounted in the tank to provide a clarification chamber and to form an aeration chamber between the conical vessel and the tank wall, and means for supplying air to the aeration chamber comprising a riding tubular member extending from adjacent the top access cover, where the upper end of the rigid tubular member is readily accessible when the top access cover is removed, to the lower part of the aeration chamber and a flexible conduit extending through the rigid tubular member with its lower end extending out of the tubular member to a position adjacent the bottom of the aeration chamber, and means connecting the upper end of the flexible conduit to a source of air under pressure to thereby allow the flexible conduit to be quickly and easily repaired and replaced by removing the top access cover.

* * * * *

REEXAMINATION CERTIFICATE (3140th)

United States Patent [19]

McKinney

[11] B1 5,221,470

[45] Certificate Issued Feb. 25, 1997

[54] APPARATUS FOR TREATING WASTE WATER

[76] Inventor: Jerry L. McKinney, P.O. Box 546, Silsbee, Tex. 77656

Reexamination Request:
No. 90/004,190, Mar. 18, 1996

Reexamination Certificate for:
Patent No.: 5,221,470
Issued: Jun. 22, 1993
Appl. No.: 808,424
Filed: Dec. 16, 1991

[51] Int. Cl.$^6$ .................. C02F 3/06; C02F 3/20
[52] U.S. Cl. ............... 210/151; 210/195.4; 210/220; 210/256; 210/311; 210/615; 261/122.1
[58] Field of Search .................. 210/150, 151, 210/195.3, 195.4, 220, 221.1, 221.2, 256, 258, 259, 305, 308, 311, 493.4, 497.1, 615; 261/122.1

[56] References Cited

U.S. PATENT DOCUMENTS 4,710,295  12/1987  Zabel .
4,929,349  5/1990  Beckman .

OTHER PUBLICATIONS

National Sanitation Foundation, Wastewater Technology, Nov. 26, 1990, pp. 1–34.

Jet, Inc., Home Plant Upflow Filter Brochure, 1978, pp. 1–2.

Zabel Industries Inc., Zabel Multi-Purpose Filter Brochure, date unknown.

*Primary Examiner*—Christopher Upton

[57] ABSTRACT

A waste water treatment plant is disclosed that uses aerobic bacteria to digest solid particles in the waste water. The plant includes a filter located just upstream of the outlet through which the water leaves the plant. The filter comprises an elongated sheet of plastic material that is wound upon itself with adjacent layers narrowly spaced to form an elongated narrow passageway. Aerobic bacteria grows on the walls of the passageway and across the top of the filter to digest the last solid particles from the water as the water slowly rises through the filter.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *